(12) United States Patent
Lin (10) Patent No.: US 8,184,705 B2
(45) Date of Patent: May 22, 2012

(54) METHOD AND APPARATUS FOR MOTION COMPENSATED FILTERING OF VIDEO SIGNALS

(75) Inventor: Peng Lin, Pleasanton, CA (US)

(73) Assignee: Aptina Imaging Corporation, George Town (KY)

( * ) Notice: Subject to any disclaimer, the term of this patent is extended or adjusted under 35 U.S.C. 154(b) by 1001 days.

(21) Appl. No.: 12/145,789

(22) Filed: Jun. 25, 2008

(65) Prior Publication Data

US 2009/0323808 A1 Dec. 31, 2009

(51) Int. Cl.
*H04N 7/12* (2006.01)
*H04N 11/04* (2006.01)

(52) U.S. Cl. ............. 375/240.16; 348/402.1; 348/413.1; 386/269

(58) Field of Classification Search ............. 375/240.16; 348/402.1, 413.1, 416.1, 699; 386/269
See application file for complete search history.

(56) References Cited

U.S. PATENT DOCUMENTS

| | | | |
|---|---|---|---|
| 5,473,384 A | 12/1995 | Jayant et al. | |
| 2005/0105620 A1* | 5/2005 | Fukushima | 375/240.16 |
| 2005/0105627 A1 | 5/2005 | Sun et al. | |
| 2005/0157794 A1 | 7/2005 | Kim et al. | |
| 2005/0190843 A1* | 9/2005 | Lee | 375/240.16 |
| 2005/0226334 A1 | 10/2005 | Han | |
| 2006/0072664 A1* | 4/2006 | Kwon et al. | 375/240.16 |
| 2006/0291561 A1* | 12/2006 | Seong et al. | 375/240.16 |
| 2007/0116125 A1* | 5/2007 | Wada et al. | 375/240.16 |
| 2007/0153900 A1* | 7/2007 | Koto et al. | 375/240.16 |
| 2007/0183505 A1* | 8/2007 | Shimizu et al. | 375/240.16 |
| 2008/0159390 A1* | 7/2008 | Lu | 375/240.16 |
| 2009/0115908 A1* | 5/2009 | Walls | 348/699 |
| 2009/0116556 A1* | 5/2009 | Ogawa | 375/240.16 |
| 2010/0239015 A1* | 9/2010 | Wang et al. | 375/240.16 |

FOREIGN PATENT DOCUMENTS

| | | |
|---|---|---|
| CN | 1856990 | 11/2006 |
| CN | 1901620 | 1/2007 |
| FR | 2809916 | 12/2001 |
| JP | 2000175081 | 6/2000 |
| JP | 2002344773 | 11/2002 |
| WO | WO 01/61993 A1 | 8/2001 |

OTHER PUBLICATIONS

Liwei Guo et al.; "A Multihypothesis Motion-Compensated Temporal Filter for Video Denoising", Image Processing, 2006 IEEE International Conference.

(Continued)

*Primary Examiner* — Andrew Lee
(74) *Attorney, Agent, or Firm* — Louis R. Levenson (57) ABSTRACT

A method and apparatus for filtering video data. First and second frames of the video data are stored. Motion adapted spatio-temporal filter (MASTF) pixel values of the second frame are calculated using pixel values of the first and second frames. The second frame is compared to the first frame to estimate motion vectors (MVs) for the second frame. Pixel MV error level indicators for the second frame are determined using the pixel values of the first and second frames and the MVs of pixels in the second frame. Motion compensated temporal filter (MCTF) pixel values of the second frame are calculated using the pixel values of the first and second frames and the MVs of pixels in the second frame. For each pixel in the second frame, a filtered pixel value is calculated using its MASTF and MCTF pixel values and its pixel MV error level indicator.

25 Claims, 8 Drawing Sheets

OTHER PUBLICATIONS

Seong-Won Lee et al., "Noise-Adaptive Spatio-Temporal Filter for Real-Time Noise Removal in Low Light Level Images", IEEE Transactions on Consumer Electronics, vol. 51, No. 2, May 2005, pp. 648-653.

Sung-Jea Ko et al., "Image Sequence Enhancement Based on Adaptive Symmetric Order Statistics", IEEE Transactions on Circuits and Systems, vol. 40, No. 8, Aug. 1993, pp. 504-509.

Sung-Jen Ko et al., "Nonlinear Spatio-Temporal Noise Suppression Techniques With Applications in Image Sequence Processing", IEEE International Symposium on Circuits and Systems, Jun. 1991, vol. 1, pp. 662-665.

Sergio Saponara et al., "Design of a Low-Power VLSI Macrocell for Nonlinear Adaptive Video Noise Reduction", EURASIP Journal or Applied Signal Processing 2004, pp. 1921-1930.

* cited by examiner

FIG. 9

METHOD AND APPARATUS FOR MOTION COMPENSATED FILTERING OF VIDEO SIGNALS

FIELD OF THE INVENTION

The present invention relates to methods and apparatus for filtering of video signals. In particular, these methods and apparatus are useful for filtering video data to improve the video quality and to increase data compression during encoding of the video data.

BACKGROUND OF THE INVENTION

Video signals are often corrupted by noise during the capture, storage and transmission steps. Noise levels are especially high when video is acquired during low-light conditions. The effect of the noise not only degrades the visual quality of the acquired video signal, but also renders encoding and compression of the video signal more difficult. Random noise does not compress well. Consequently, random noise may result in substantial bit rate overhead in the encoded video signal if it is to be compressed. Filtering of video signals is one method that may be used to reduce or remove noise from video signal. This filtering desirably enhances the video quality, and at the same time makes video data easier to encode. Pre-compression filtering of video data has captured more and more attention from the video compression industry. The design and implementation of such filtering often differentiates one product from another.

Consideration of both spatial and temporal characteristics of the video signal is desirable when designing video filters, such as a video pre-filter. In non-motion areas of the received video signal, it may be desirable to apply a temporal filter, while in areas with motion, applying a spatial filter may be desirable. The use of a temporal filter in area of frames with significant motion may cause the addition of motion blur. Using a spatial filter in non-motion areas of frames may lessen the noise reduction effect of a video pre-filter. Thus, designing a pre-filter that has both spatial and temporal filtering capabilities and that can dynamically adjust its spatial-temporal filtering characteristics to the received video content is desired.

In order to avoid motion blur, a motion adaptive spatio-temporal filter (MASTF) uses a motion-detection-based adaptive mechanism to smoothly switch between temporal filtering and spatial filtering of the video signal when motion is detected. The MASTF provides a good balance between performance and costs, which makes it attractive for use in many consumer electronics products; however, MASTF does not take full advantage of all of the temporal correlations that may exist in a video sequence. It only applies temporal filtering in areas of frames determined to be non-motion areas. As a result, the performance of MASTF in areas of frames in which motion is detected may not be as good as its performance in non-motion area.

Embodiments of the present invention include video filters that may improve both the quality of the resulting video and the compression rate when encoding the video signal. These are described below.

BRIEF DESCRIPTION OF THE DRAWINGS

According to common practice, the various features of the drawings are not to scale. On the contrary, the dimensions of the various features are arbitrarily expanded or reduced for clarity. Included in the drawing are the following figures.

DETAILED DESCRIPTION OF THE INVENTION

Embodiments of the present invention use a motion adaptive spatio-temporal filter (MASTF) and a motion compensated temporal filter (MCTF) to provide improved filtering, such as pre-filtering, of video signals. Methods and apparatus of these embodiments use a soft switching approach to interpolate between these different filtering techniques. This approach allows embodiments of the present invention to take selective advantage of strengths and desirable features of both filtering techniques. For example, MCTF is able to apply temporal filtering in both non-motion and motion areas by following along motion trajectories using motion vector estimation techniques. MCTF typically provides quality filtering for areas (i.e. pixels) of a frame for which there is a well defined motion vector when compared to a previous frame; however, for areas in which the motion vector is not well defined (e.g. areas occluded in one of the frames), MCTF may not work as desired, but MASTF may work.

The performance of an MCTF may be affected by the accuracy of the motion vector estimation; however, motion estimation can be a difficult task. Incorrect motion vector estimates are likely in many situations due to the ill-posed nature of the motion estimation problem. In some situation, such as the occlusion of part of the image between frames, accurate estimation of motion vectors may be extremely unlikely. The use of incorrect motion vectors in MCTF introduces artifacts in the filtered video image. Therefore, it is desirable to have a robust filtering algorithm that is able to deal with the situation when the accuracy of the estimated motion vectors is questionable.

It is also noted that the computational cost for MCTF may be higher than for MASTF due to the use of motion estimation. This higher computational cost may limit the desirability of MCTF for some applications; however, when computing power is allowed or when motion vectors are already available (e.g., from an encoder), the use of MCTF and/or a hybrid MASTF/MCTF method, as taught in embodiments of the present invention, may be preferred.

Figure 1:
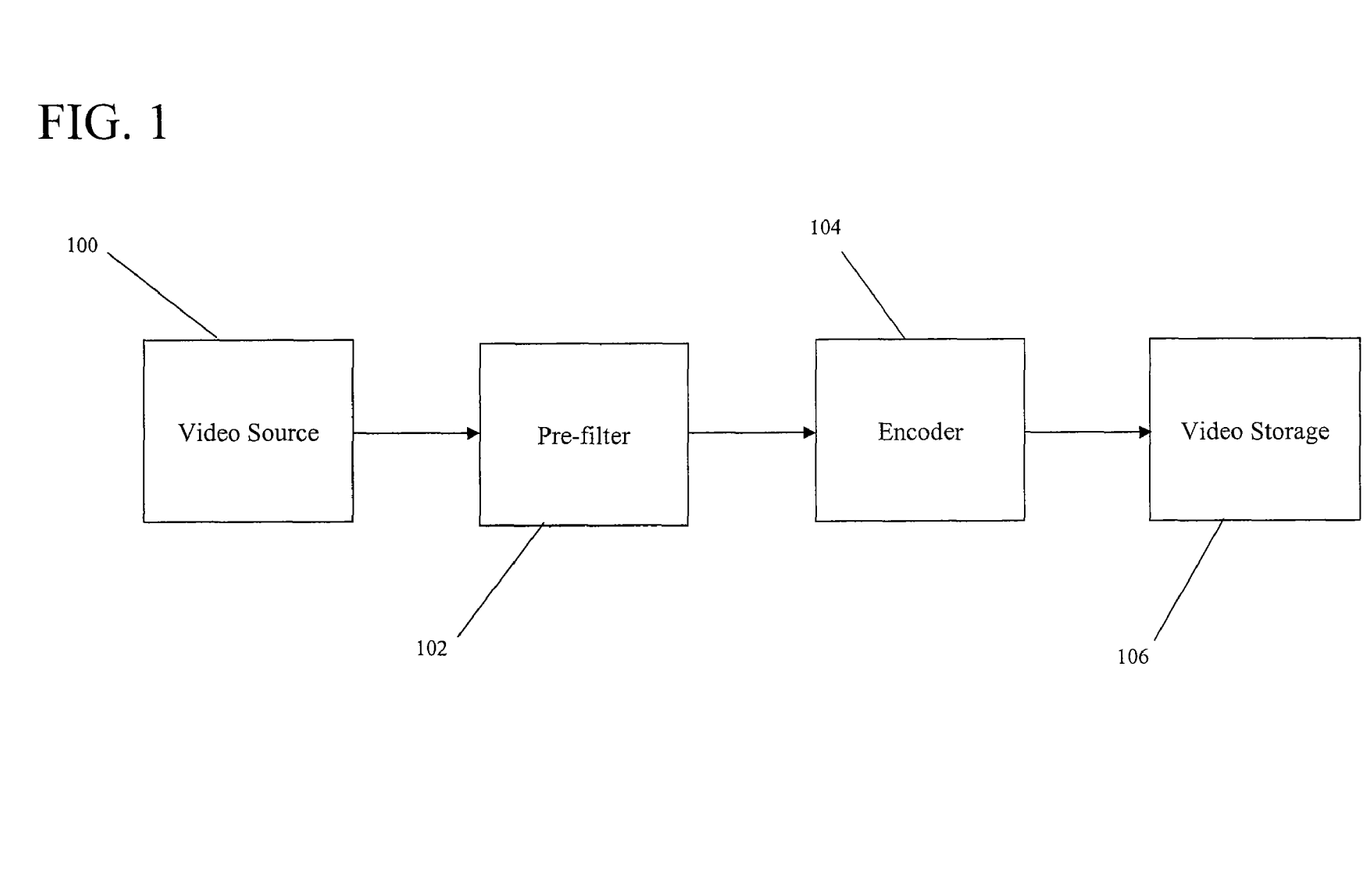
FIG. 1 is a schematic drawing illustrating a video encoding and storage according to one embodiment of the present invention.

FIG. 1 illustrates an example video signal encoding and storage apparatus according to the present invention. This example video signal encoding and storage apparatus includes video source 100, pre-filter 102, encoder 104, and video storage apparatus 106.

Video source 100 may be any source of a video signal, which may be either live or recorded. Such video sources may include, for example, a video camera, a video medium reader with a video storage medium, such as a CD; DVD; a Blu-Ray DVD; or a video tape, with the video data stored on it, or a general purpose computer with the video data stored on a computer readable storage medium. Such computer-readable media include; integrated circuits, magnetic and optical storage media.

An example embodiment of pre-filter 102 is described in detail below with respect to FIG. 2.

Encoder 104 may be any sort of video encoder used to compress video data. It may include special purpose circuitry, an application specific integrated circuit (ASIC), or a general purpose computer programmed to execute a video encoding protocol, such as the H.264 protocol.

Video storage apparatus 106 may include a recording apparatus and any sort of storage medium used to store digital data, such optical disks, magnetic disks, magneto-optical disks, magnetic tape, static memory, or dynamic memory.

Figure 2:
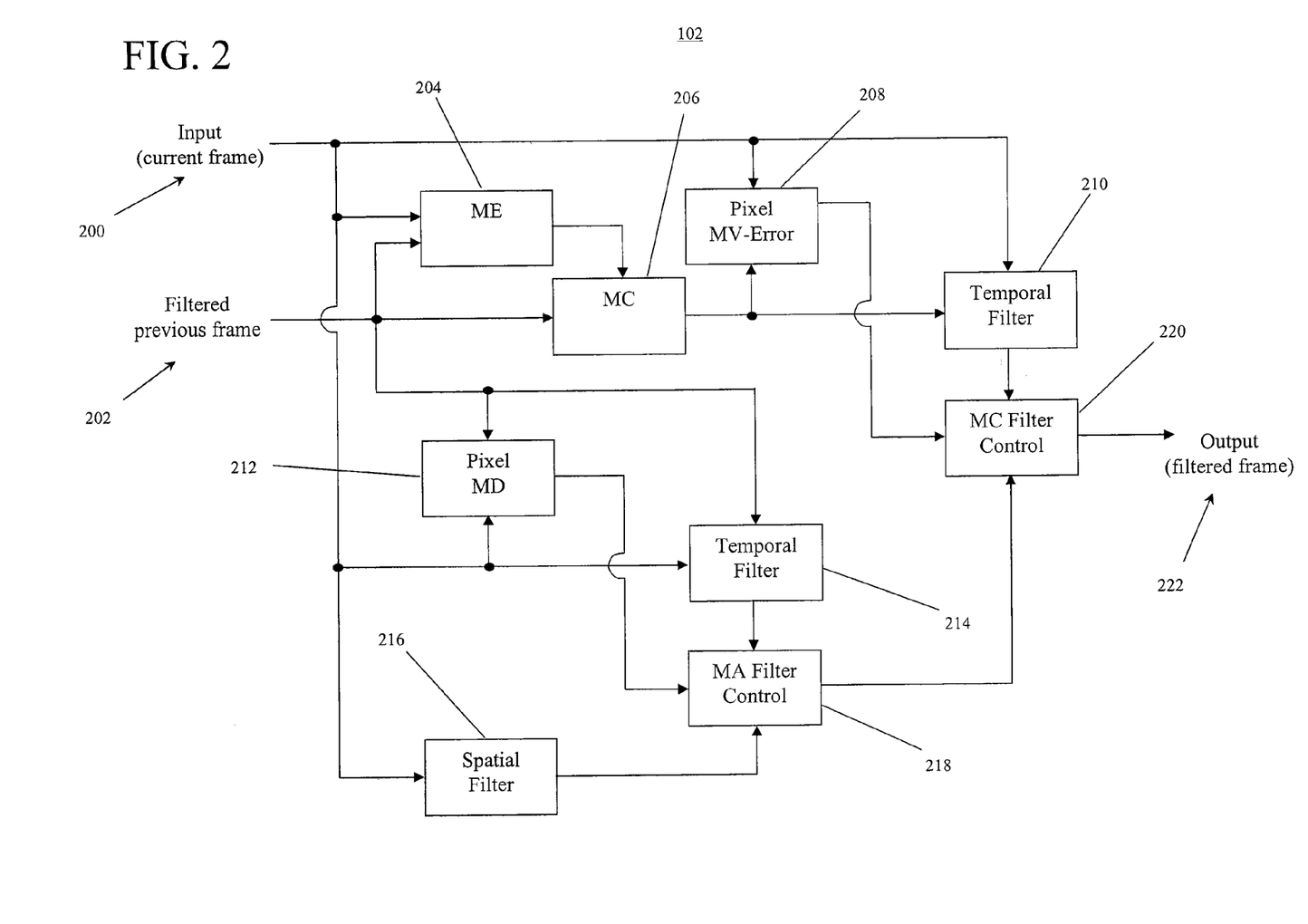
FIG. 2 is a schematic drawing illustrating a video filter according to one embodiment of the present invention.

FIG. 2 shows a schematic block diagram of an example embodiment of pre-filter 102. This example embodiment is a recursive filter, using the previous filtered frame of the video sequence to filter each frame. It includes: input buffer 200 to store the next frame of the video sequence to be filtered; filtered frame buffer 202 to store the previous filtered frame of video data; motion vector (MV) estimation processor 204 coupled to input buffer 200 and filtered frame buffer 202 to receive video data; motion compensation (MC) processor 206 coupled to filtered frame buffer 202 and MV estimation processor 204 to receive video data and estimated MVs; pixel MV error processor 208 coupled to input buffer 200 and MC processor 206 to receive video data; MC temporal filter (MCTF) processor 210 coupled to input buffer 200 and MC processor 206 to receive video data; a motion adaptive spatio-temporal filter (MASTF) coupled to input buffer 200 and filtered frame buffer 202 to receive video data; filter control processor 220 coupled to pixel MV error processor 208, MCTF processor 210, and the MASTF to receive pixel MV error indicators and video data; and output buffer 222 coupled to filter control processor 220 to receive the new filtered frame. Filtered frame buffer 202 is coupled to output buffer 222 so that, as the next unfiltered frame of video data is stored in input buffer 200, the previous filtered frame is replaced by the new filtered frame.

Figure 5:
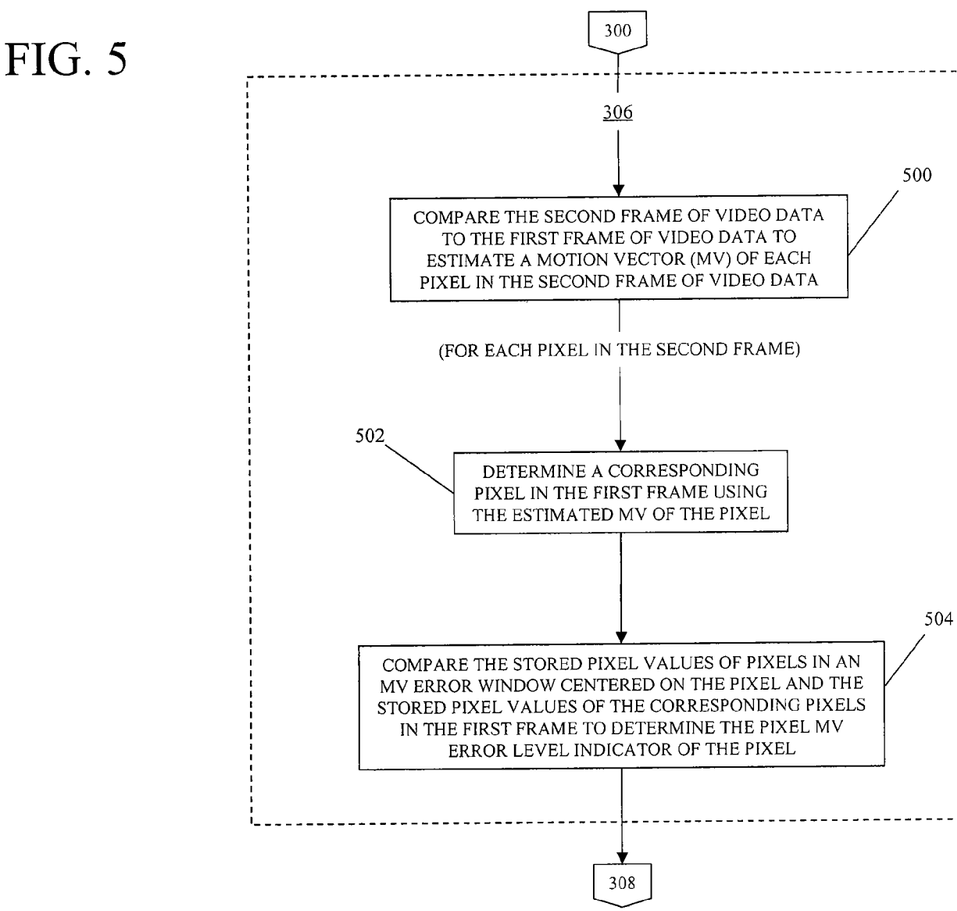
FIG. 5 is a flowchart illustrating a method for determining corresponding pixels and pixel motion vector (MV) error level indicators between frames of video data that may be used in the embodiments of the present invention.

MV estimation processor 204 compares a previously filtered frame of the video signal to an unfiltered frame of the video signal to estimate an MV of each pixel in the unfiltered frame using a motion estimation algorithm, such as the example motion estimation algorithm described below in detail with reference to FIG. 5. The MV estimation processor includes an MV estimation buffer to store the estimated MV of each pixel and to provide the stored estimated MVs to MC processor 206.

MC processor 206 determines a corresponding pixel of filtered frame of the video signal for each pixel of the unfiltered frame based on the MV of the pixel estimated by MV estimation processor 204. The MV calculated by MV estimation processor 204 is typically calculated to be an integral number of rows by an integral number of columns; however, it is contemplated that the MV may be quantized in units of 1/m row pixels by 1/n column pixels, m and n are positive integers, e.g. an MV of 1½ rows by 2 columns. It is noted that most often n=m. In cases of non-integral MV, the corresponding pixel for each pixel of the unfiltered frame of the video signal is estimated by interpolating the pixels of the filtered frame that are within about one pixel of the displacement from the pixel of the unfiltered frame defined by the MV.

MC processor 206 includes an MC buffer to store pixel values of the corresponding pixel of filtered frame (actual or interpolated) for each pixel of the unfiltered frame and to provide these stored corresponding pixel values to both pixel MV error processor 208 and to MCTF processor 210.

In an alternative embodiment MV estimation processor 204 and MC processor 206 may be combined in an MC processor that combines the functions of these two processors. This combined MC processor may still include an MV processor and a corresponding pixel processor.

Pixel MV error processor 208 compares the pixels of the unfiltered frame to the corresponding pixels of the filtered frame to determine a pixel MV error for each pixel of the unfiltered frame of the video signal. It includes a pixel MV error buffer to store the pixel MV error of each pixel of the unfiltered frame and to provide the stored pixel MV errors to filter control processor 220.

MCTF processor 210 computes a MCTF pixel value for each pixel of the unfiltered frame. The MCTF pixel value of each pixel of the unfiltered frame is calculated as a weighted average of the pixel value of the unfiltered pixel and the pixel value of the corresponding pixel in the filtered frame. MCTF processor 210 includes an MCTF buffer to store the MCTF pixel value for each pixel of the unfiltered frame and to provide the stored MCTF pixel values to filter control processor 220.

The MASTF processor computes a MASTF pixel value for each pixel of the unfiltered frame. The MASTF pixel value of each pixel of the unfiltered frame is calculated as a weighted average of a temporal filter (TF) pixel value and a spatial filter (SF) pixel value of the pixel. The weighting of this weighted average is based on the motion level of the pixel.

The MASTF includes: motion level (ML) processor 212 coupled to input buffer 200 and filtered frame buffer 202 to receive video data; TF processor 214 coupled to input buffer 200 and filtered frame buffer 202 to receive video data; SF processor 216 coupled to input buffer 200 to receive video data; and MASTF control processor 218 coupled to ML processor 212, TF processor 214, and SF processor 216 to receive ML indicators and video data.

ML processor 212 compares the filtered frame of the video signal to the unfiltered frame of the video signal and determines an ML of each pixel in the unfiltered frame. The ML processor includes an ML buffer to store the ML of each pixel in the unfiltered frame and to provide the stored MLs to MASTF control processor 218.

TF processor 214 computes a TF pixel value for each pixel of the unfiltered frame. The TF pixel value of each pixel of the unfiltered frame is based on the pixel value of the unfiltered pixel and the pixel value of the collocated pixel in the filtered frame, e.g. the TF pixel value may be a weighted average of these pixel values. TF processor 214 includes a TF buffer to store the TF pixel value for each pixel of the unfiltered frame and to provide the stored TF pixel values to MASTF control processor 218.

SF processor 216 computes a SF pixel value for each pixel of the unfiltered frame. The SF pixel value of each pixel of the unfiltered frame is based on the pixel value of the unfiltered pixels in a window centered on the pixel, e.g. the SF pixel value may be a weighted average of these pixel values. SF processor 216 includes a SF buffer to store the SF pixel value for each pixel of the unfiltered frame and to provide the stored SF pixel values to MASTF control processor 218.

MASTF control processor 218 computes a MASTF pixel value for each pixel of the unfiltered frame. The MASTF pixel value of each pixel of the unfiltered frame is calculated as a weighted average of the TF pixel value and the SF pixel value of the pixel. The weighting of this weighted average is based on the ML of the pixel. MASTF control processor 218 includes an MASTF buffer to store the MASTF pixel value for each pixel of the unfiltered frame and to provide these stored MASTF pixel values to filter control processor 220.

Filter control processor 220 computes a filtered pixel value for each pixel of the unfiltered frame. The filtered pixel value of each pixel of the unfiltered frame is calculated as a weighted average of the MCTF pixel value and the MASTF pixel value of the pixel. The weighting of this weighted average based on the pixel MV error of the pixel. Filter control processor 220 of example filter 102 of FIG. 2 smoothly switches between the filtered video data of MCTF processor 210 and the MASTF. This switching is accomplished using a soft switching mechanism based on the pixel MV error indicators calculated by pixel MV error processor 208.

The various processors used in the example embodiments of FIGS. 1 and 2 may include one or more of: special purpose circuitry; application specific integrated circuits; and/or a general purpose computer programmed to perform the desired processing steps.

Figure 3:
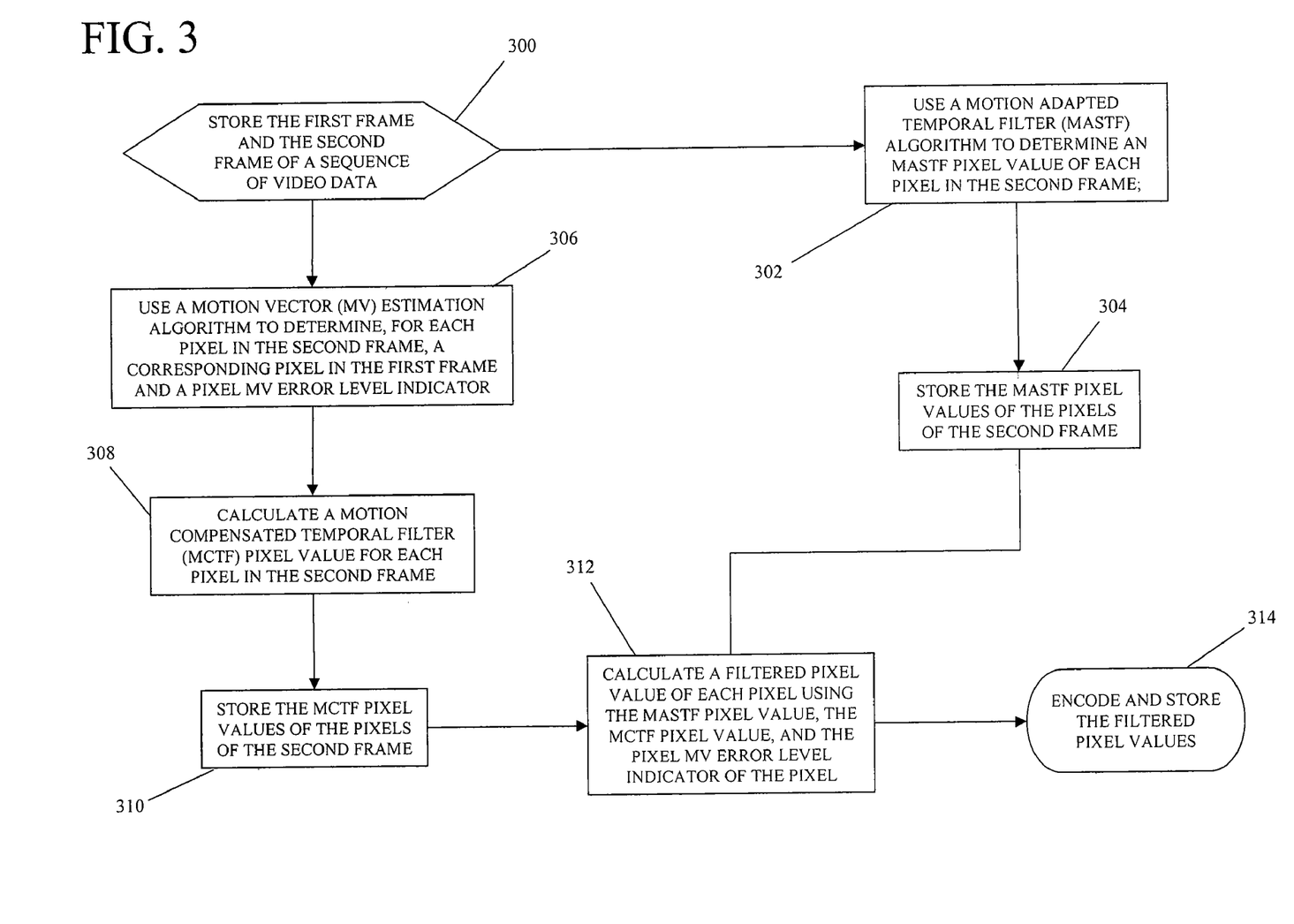
FIG. 3 is a flowchart illustrating a method for filtering, encoding, and storing video data according to one embodiment of the present invention.
Figure 4:
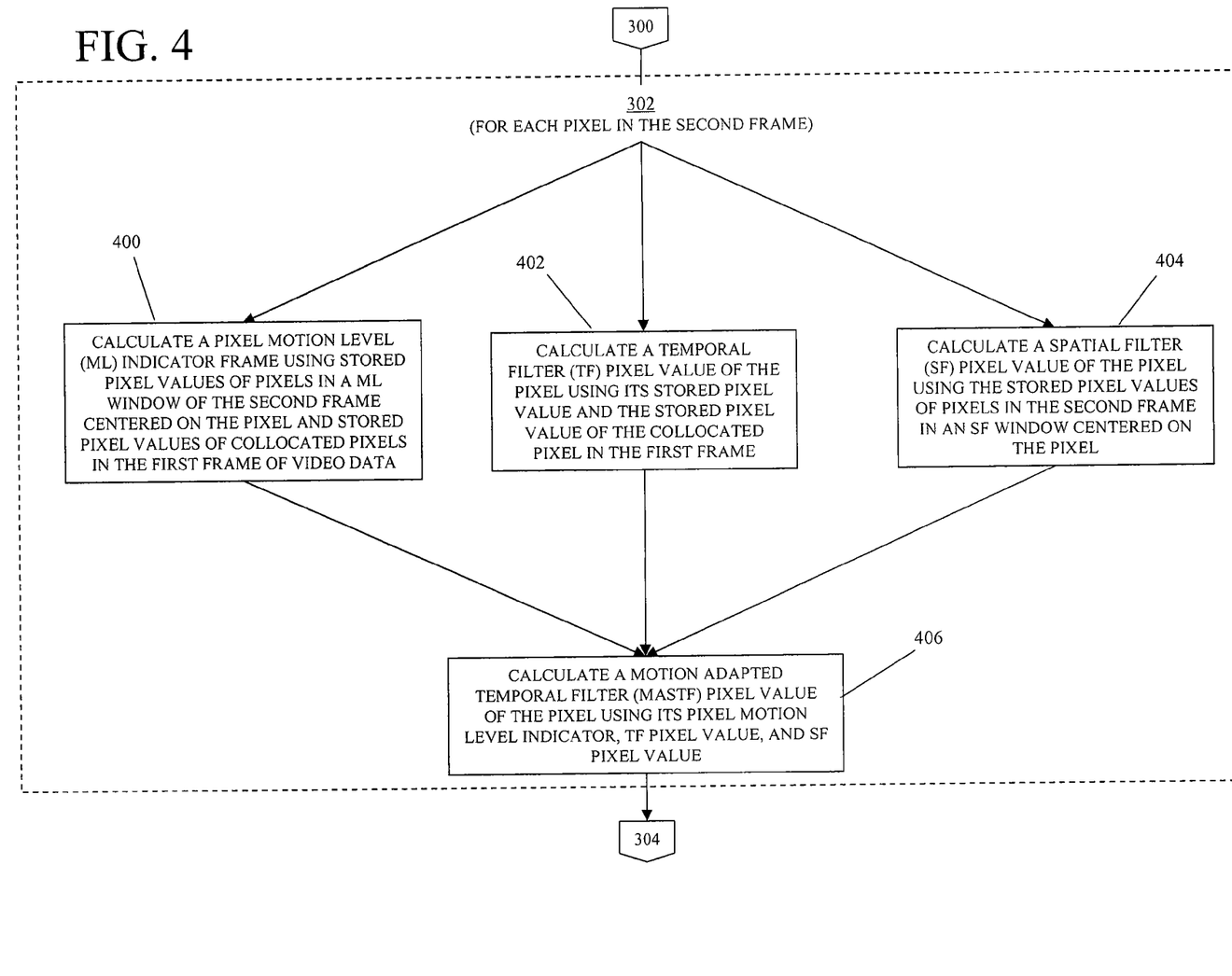
FIG. 4 is a flowchart illustrating a method for performing motion adaptive spatio-temporal filtering of video data that may be used in the embodiments of the present invention.

FIG. 3 illustrates an example method of producing filtered video data for encoding and storing according to an embodiment of the present invention. FIGS. 4 and 5 illustrate detailed example approaches to certain steps of the example method of FIG. 3.

Throughout this disclosure $f(x,y,k)$ denotes a video signal with x, y being the pixel indices (row and column) and k being the time index (or frame index). At the top level, the proposed motion compensated temporal filter can be described by the following equation:

$$\tilde{f}(x,y,k) = (1-\alpha(x,y,k)) \cdot f_{mc}(x,y,k) \cdot f_{ma}(x,y,k) \quad (1)$$

where $\tilde{f}$ is the filtered frame, i.e., the result of the example filtering method; $f_{mc}(x,y,k)$ is the output frame of a MCTF processor; $f_{ma}(x,y,k)$ is the output frame of a MASTF processor; and $\alpha(x,y,k)$ is the pixel MV error level indicator, which desirably has a value ranging from 0 to 1.

The MASTF used by the example filtering method desirably includes a pixel ML detector, a (non-motion compensated) temporal filter, a spatial filter, and a motion adaptive filter control.

A first (filtered) frame and second (unfiltered) frame of a sequence of video data are stored at step 300. Desirably the first frame directly precedes the second in the sequence of video data. At step 302, a MASTF algorithm is used to determine a MASTF pixel value for each pixel in the second (unfiltered) frame of video data.

The basic idea of the MASTF algorithm is to adjust the filter based on motion information. When there is no motion, the filter is tuned to do more temporal filtering for better noise reduction. When there is motion presented, the filter is tuned to do more spatial filtering to avoid motion blur. Details of this step are illustrated in FIG. 4.

The MASTF function $f_{ma}(x,y,k)$ used in Eq. (1) above may be described by the following equation:

$$f_{ma}(x,y,k) = (1-\beta(x,y,k)) \cdot f_{tp}(x,y,k) + \beta(x,y,k) \cdot f_{sp}(x,y,k) \quad (2)$$

where $f_{tp}(x,y,k)$ is the (non-motion compensated) temporal filtered frame; $f_{sp}(x,y,k)$ is a spatial filtered frame; and $\beta(x,y,k)$ is a pixel ML indicator, which desirably has a value ranging from 0 to 1.

For each pixel in the second frame, a temporal filter (TF) pixel value of the pixel is calculated using the stored pixel value of the unfiltered pixel and the stored pixel value of the collocated pixel in the first frame at step 402. For example, the TF pixel value, $f_{tp}(x,y,k)$, of pixel (x,y) in the second frame of video data is calculated as a weighted average of the stored pixel value of the pixel and the stored pixel value of the collocated pixel in the first frame. Typical filter weighting factors that may be chosen are ⅔ and ⅓.

At step 404, a spatial filter (SF) pixel value is calculated for each pixel in the second frame using the stored pixel values of pixels in the second frame in an SF window centered on the pixel. The spatial filter $f_{sp}(x,y,k)$ used in equation (2) is desirably a shape adaptive filter defined as following:

$$f_{sp}(x,y,k) = \frac{\sum_{x',y' \in W_0} \omega(x',y',k) \cdot f(x',y',k)}{\sum_{x',y' \in W_0} \omega(x',y',k)} \quad (3)$$

where $W_0$ is an SF window centered at pixel (x, y), and $\omega(x', y', k)$ is defined by:

$$\omega(x',y',k) = \begin{cases} w_1, & \text{if } |f(x',y',k) - f(x,y,k)| < c_1 \sigma_n \\ w_2, & \text{if } c_1 \sigma_n \leq |f(x',y',k) - f(x,y,k)| < c_2 \sigma_n \\ w_3, & \text{if } c_2 \sigma_n \leq |f(x',y',k) - f(x,y,k)| < c_3 \sigma_n \\ w_4, & \text{otherwise} \end{cases} \quad (4)$$

where $\sigma_n$ is the noise level, and $c_1, c_2, c_3, w_1, w_2, w_3$ and $w_4$ are the filter parameters. In one example embodiment, the filter parameters are chosen as following: $c_1=1$, $c_2=2$, $c_3=4$, $w_1=3$, $w_2=2$, $w_3=1$ and $w_4=0$. The SF window is desirably M rows by N columns, where M and N are positive odd integers. It may be desirable for M=N (e.g. a 5×5 or 3×3 window). The SF window, $W_0$, in this embodiment is chosen as a 3×3 window. It is noted that the shape adaptive filter defined in equation (3) and (4) is able to adapt its shape to the shape of the image edges in a window to avoid blurring.

In addition, the weighting of the pixels may be made to depend on the distance in rows and columns between the corresponding pixel in the SF window and the pixel for which the SF pixel value being calculated.

The pixel ML indicator $\beta(x,y,k)$ in equation (2) is based on the pixel motion detector, which detects pixel motion between the second frame and the filtered first frame. Small pixel ML indicator values indicate no or weak motion. Large pixel ML indicator values indicate strong motion.

For each pixel in the second frame, a pixel ML indicator is calculated using stored pixel values of pixels in an ML window centered on the pixel in the second frame and stored pixel values of collocated pixels in the first frame of video data at step 400. The ML window is desirably M rows by N columns, where M and N are positive odd integers. It may be desirable for M=N (e.g. a 5×5 or 3×3 window). In an example embodiment, to detect the motion at pixel (x, y), a pixel difference value may be computed as the RMS between the pixel values of the second frame within the ML window centered at (x, y) and the their collocated pixel values in the first frame as following:

$$d(x, y, k) = \left[ \sum_{x', y' \in W_{ML}} \frac{[f(x', y', k) - f(x', y', k-1)]^2}{|W_{ML}|} \right]^{\frac{1}{2}}, \quad (5)$$

where $|W_{ML}|$ denotes the window size. In another example embodiment, to detect the motion at pixel (x, y), the pixel difference value may be computed as the absolute difference between the pixel values of the second frame within the ML window centered at (x, y) and the their collocated pixel values in the first frame as following:

$$d(x, y, k) = \sum_{x', y' \in W_{ML}} \frac{|f(x', y', k) - f(x', y', k-1)|}{|W_{ML}|}, \quad (6)$$

The pixel ML indicator of each pixel in the second frame of video data is desirably a continuous function of the pixel difference value of the pixel that ranges from 0 to 1. For example, the pixel ML indicator, $\beta(x,y,k)$, of each pixel in the second frame of video data may be calculated using the following:

$$\beta(x, y, k) = \frac{\min[s_2 - s_1, \max(d(x, y, k) - s_1, 0)]}{s_2 - s_1}, \quad (7)$$

where s1 and s2 are ML parameters calculated based on the noise level, $\sigma_n$, of the video data. For example, the ML parameters may be given by $s_1 = q_1 \sigma_n$ and $s_2 = q_2 \sigma_n$ with $q_1$ and $q_2$ chosen as $q_1=1$ and $q_2=2$.

Figure 9:
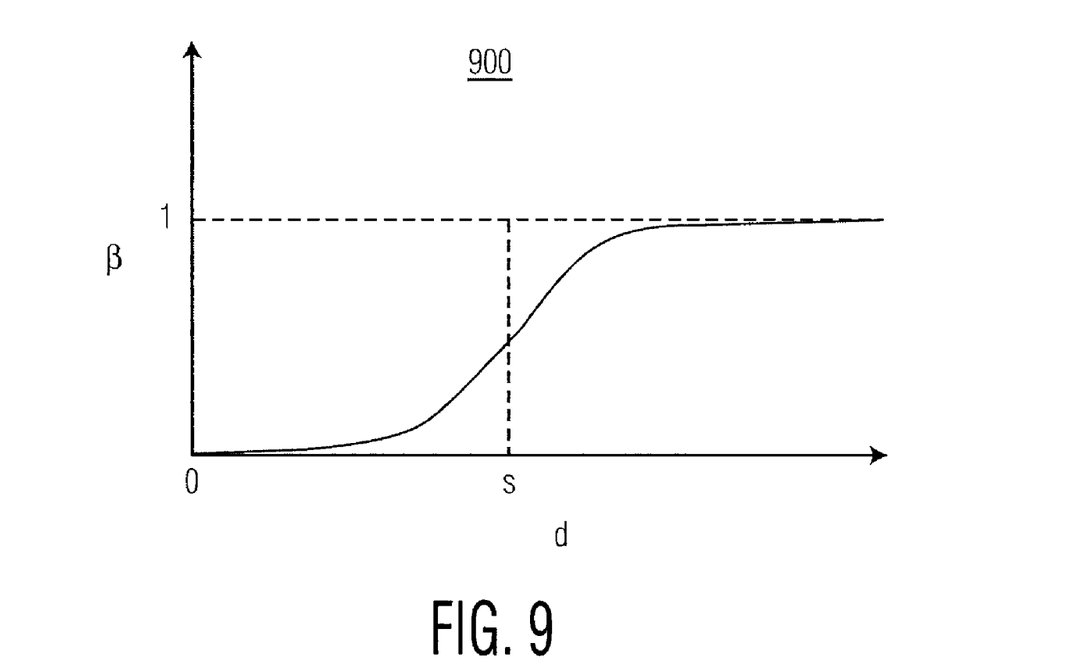
FIG. 9 is a graph illustrating a pixel motion level indicator that may be used in the methods of FIGS. 3 and 4.

FIG. 9 illustrates alternative continuous function 900, an arctangent function centered on ML parameter s, which is also desirably based on the noise level.

For each pixel in the second frame, a MASTF pixel value of the pixel using the pixel motion level indicator, the TF pixel value, and the SF pixel value of the pixel at step 406. As shown in the example embodiment of Eq. (2), when the value of $\beta(x,y,k)$ is close to 0 (i.e. no motion) the temporal filter, $f_{tp}(x,y,k)$, dominates the MASTF, $f_{ma}(x,y,k)$, and when the value of $\beta(x,y,k)$ is close to 1 (i.e. strong motion) the temporal filter is gradually switched off and the spatial filter, $f_{sp}(x,y,k)$, starts to dominate. This desirably avoid motion blur for the MASTF, $f_{ma}(x,y,k)$, in the motion area.

It is noted that the MASTF is described above for the luma (Y) signal. Similar filtering processes may also be applied to one or both of the chroma signals (U and V) with minor changes in the calculation of the pixel ML indicator. Let $\beta_u(x,y,k)$ and $\beta_v(x,y,k)$ be the chroma ML indicators for U and V, respectively, which are calculated similarly as the luma ML indicator $\beta(x,y,k)$ for Y. Although $\beta_u(x,y,k)$ and $\beta_v(x,y,k)$ may be used to determine the weighting of the TF and SF chroma values in the calculation of the MASTF pixel values of the plurality of pixels, it may be desirable to use effective chroma ML indicators $\tilde{\beta}_u(x,y,k)$ and $\tilde{\beta}_v(x,y,k)$ instead, where $\tilde{\beta}_u(x,y,k)$ and $\tilde{\beta}_v(x,y,k)$ are defined as follows:

$$\tilde{\beta}_u(x,y,k) = (1 - \beta_u(x,y,k)) \cdot \beta(x,y,k) + \beta_u(x,y,k), \text{ and} \quad (8)$$

$$\tilde{\beta}_v(x,y,k) = (1 - \beta_v(x,y,k)) \cdot \beta(x,y,k) + \beta_v(x,y,k). \quad (9)$$

The use of these effective chroma ML indicators guarantees that when the TF is switched off for the luma (Y) signal, it is also switched off for chroma (U and V) signals.

A motion vector (MV) estimation algorithm is used at step 306 to determine a corresponding pixel in the first frame for each pixel in the second frame and a pixel MV error level indicator of each pixel in the second frame. Many block matching MV estimation algorithms have been developed; however, most of these algorithms are optimized for video coding. Although they may be used, MV estimation algorithms developed for video coding may not be preferred for use in MCTF calculations. In MCTF calculations, the removal of noise presented in a video signal is desired; however, MV estimation algorithms developed for video coding are typically optimized to obtain the best matched blocks to reduce the residual for encoding. These best matched blocks may also come with matched noise, which is hard to remove using a MCTF. Therefore, it may be desirable to use an MV estimation algorithm that is specifically designed for use in an MCTF. An example of such an MV estimation algorithm is illustrated in FIG. 5.

At step 500, the second frame of video data is compared to the first frame of video data to estimate the MV of each pixel in the second frame of video data. Usually pixel MVs are obtained by first estimating block MVs, then assigning the block MV to each pixel inside the block. Because the proposed MCTF uses a motion estimation (ME) window to check the pixel MV error, the motion compensation desirably extends beyond the block boundaries. The MV error window is M rows by N columns, where M and N are positive odd integers (for example, 5×5 or 3×3).

Figure 6:
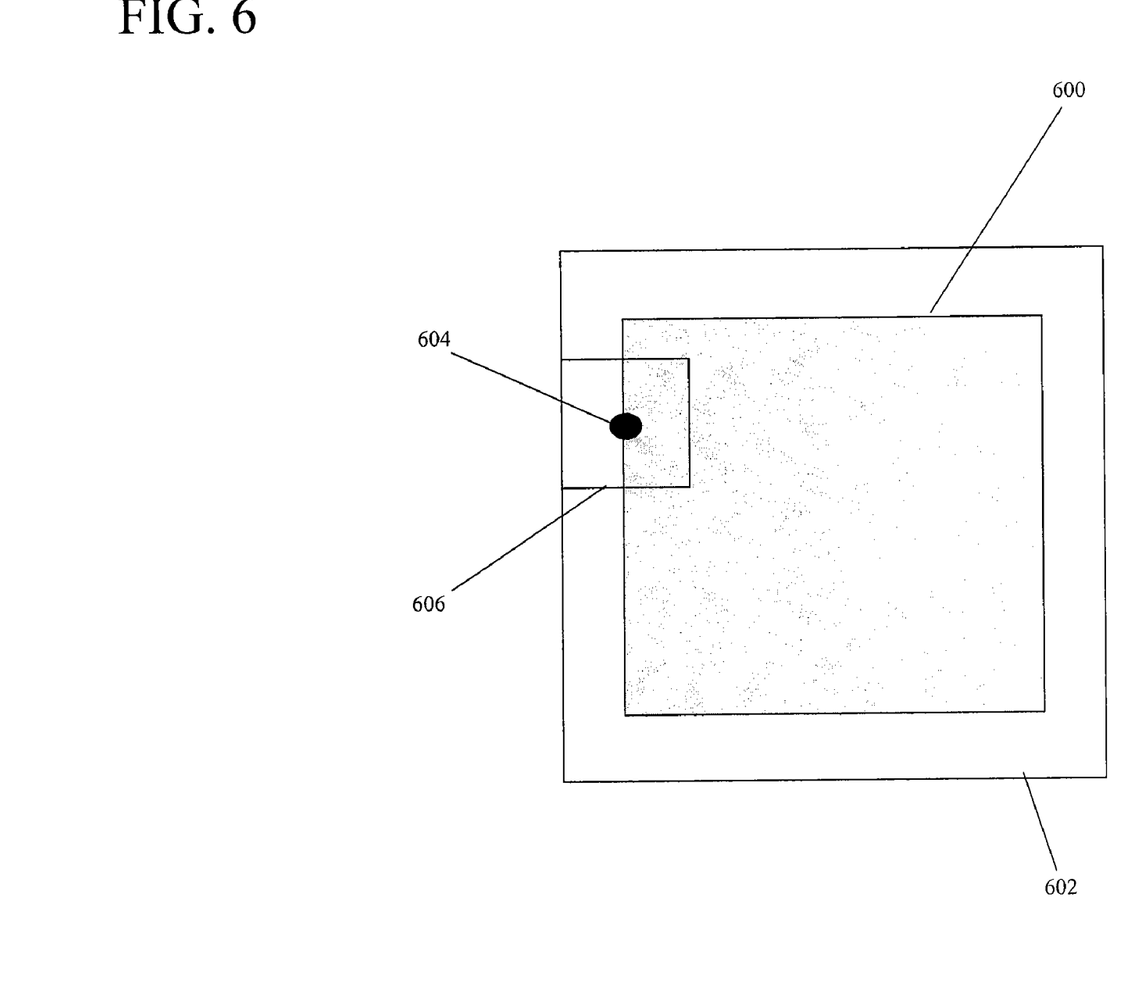
FIG. 6 is a top plan drawing illustrating an overlapping block pixel configuration that may be used in the methods of FIGS. 3 and 5.

This overlapping block motion compensation uses the MVs of the current block and its neighboring blocks for motion compensation. It is noted that, although overlapping block compensation gives better results, it also uses more line buffers and more introduce additional computational delay. Therefore, instead of using traditional overlapping block motion compensation, it may be desirable to extend the regular blocks of pixels (e.g., 16×16 or 8×8 pixel blocks) used for MV estimation by half the width of the window used for checking the pixel MV error (rounded down). The MV for the extended block may then be estimated to generate the MVs for the pixels beyond the boundaries of the regular block. FIG. 6 illustrates this overlapping block geometry. A non-overlapping block 600 is extended to form overlapping block 602. When MV error window 606 is centered on pixel 604 that is located on the outer column of non-overlapping block 600, as shown in FIG. 6, MV error window 606 extends to the edge of overlapping block 602.

In the following description of an example MV estimation algorithm, a 5×5 MV error window is used. This is for illustration purposes and is not intended to be limiting.

The example MCTF is a recursive filter, which estimate MVs between the current frame $f(x,y,k)$ and the filtered previous frame $\tilde{f}(x,y,k-1)$.

For MV estimation, the current frame is first divided into non-overlapping 16×16 blocks. Each block is extended into an 18×18 block (for a 5×5 MV error window case). As a result, the current frame is divided into overlapping 18×18 blocks with the original non-overlapping 16×16 blocks co-centered with their corresponding extended 18×18 blocks. B is used to denote the original block, and $\overline{B}$ is used to denote the extended block. The MV search uses the extended (18×18) block, $\overline{B}$, instead of the original (16×16) block, B.

Figure 7:
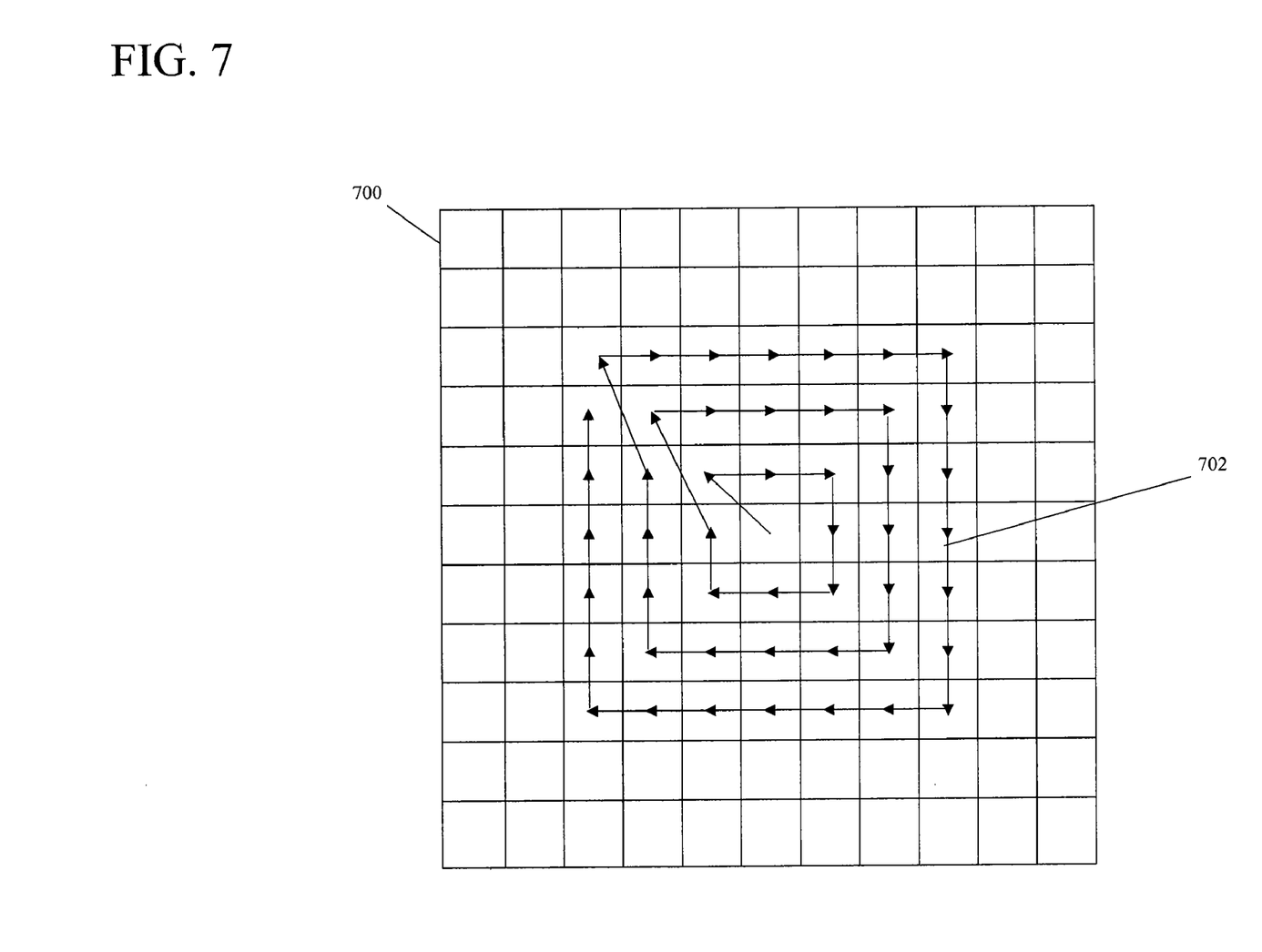
FIG. 7 is a top plan drawing illustrating spiral search pattern that may be used for overlapping block match algorithms in the methods of FIGS. 3 and 5.

The example block matching algorithm uses a spiral search pattern, as shown in FIG. 7, and a noise level dependent threshold for early termination. Using a noise level dependent threshold for the early termination of MV search may desirably improve the performance of the proposed MCTF. The early termination may not only speed up the MV search, but also reduces matching noise.

To find the MVs, for each extended block, $\overline{B}$, a matching block in the filtered previous frame is searched within a predefined search range. As shown in FIG. 7, the search starts with the center position of search range 700, which corresponding to zero MV, and follows spiral search pattern 702. The sum of absolute differences (SAD) may be used to measure the matching error, and is defined as:

$$SAD(dx, dy) = \sum_{x,y \in B} |f(x, y, k) - \tilde{f}(x + dx, y + dy, k - 1)|. \quad (10)$$

where dx is the column displacement and dy is the row displacement. Alternatively, other functions, such as root mean square may be used to measure the matching error at each displacement vector, (dx,dy).

For each searching position along spiral search pattern 702, the matching error is computed. Smaller matching errors are recorded and larger matching errors are discarded. Each computed matching error is also compared with a threshold for early termination. If the matching error is below the threshold, the searching is terminated. The displacement vector that corresponds to the searching position where the searching is terminated is determined to be the MV of the overlapping block under consideration. If the search pattern is completed then the displacement vector that corresponds to the searching position with the smallest computed matching error is determined to be the MV of the overlapping block under consideration.

The threshold for early termination is desirably chosen to depend on the noise level, (noise standard deviation), as follows:

$$T = C \cdot |\overline{B}| \cdot \sigma_n \quad (11)$$

where $|\overline{B}|$ is the block size, and C is a predetermined constant, which may desirably be 1.

Once the estimated MV for the overlapping block $\overline{B}$ is determined, every pixel in non-overlapping block B is desirably considered to have this same MV.

It is noted that the example MV estimation is disclosed for the luma (Y) signal. Chroma (U and V) signals desirably share the same MVs as the luma (Y) signal through the co-located luma-chroma blocks.

Once the MV of each pixel of the second frame is estimated, a corresponding pixel in the first frame is determined using the estimated MV of the pixel at step 502 for each pixel in the second frame. This determination is fairly straightforward when using the example MV estimation algorithm described above, which determines MVs with integral units of rows and columns; however, other MV estimation algorithms may be used in embodiments of the present invention. As discussed above with reference to FIG. 2, if an MV estimation algorithm that determines MVs with fractional row and column units, the pixel value of the corresponding pixel in the first frame may be calculated by interpolating the pixel values of pixels in the first frame near the displacement of the MV.

It is noted that no MV estimation algorithm can guarantee that all of the estimated MVs for every pixel are accurate. For example, one example in which MV estimation algorithms typically fail is occlusions. Therefore, pixel MV error is unavoidable. The use of incorrect pixel MVs introduces artifacts in MCTF video data. To reduce this shortcoming of standard MCTF, in embodiments of the present, pixel MV errors for each pixel are desirably determined before applying the MCTF to the second frame video data. For each pixel in the second frame, the stored pixel values of pixels in an MV error window centered on the pixel in the second frame are compared and the stored pixel values of the corresponding pixels in the first frame of video data to determine a pixel MV error level indicator of each pixel at step 504.

In an example embodiment, a pixel MV error for pixel (x, y) in block B, may be determined using a 5×5 (or 3×3) MV error window $W_{ME}$ centered at (x, y) to compute a pixel MV error, e(x,y,k), between the pixel values of pixels of the current frame and their corresponding motion compensated pixel using one of the following:

$$e(x, y, k) = \left[ \sum_{x',y' \in W_{ME}} \frac{[f(x', y', k) - f(x' + dx, y' + dy, k - 1)]^2}{|W_{ME}|} \right]^{\frac{1}{2}}; \quad (12)$$

or $$e(x, y, k) = \sum_{x',y' \in W_{ME}} \frac{|f(x', y', k) - f(x' + dx, y' + dy, k - 1)|}{|W_{ME}|}, \quad (13)$$

where $|W_{ME}|$ denotes the MV error window size.

It is noted that when targeted pixel 604, (x, y), is near the boundaries of non-overlapping block 600, some of its surrounding pixels (x', y') within MV error window 606 centered at (x, y) may be located outside non-overlapping block 600 (see FIG. 6); however these pixels are still within overlapping block 602. Thus, the motion compensation for these pixels and the computation in Eq. (12) or (13) valid. That is why it is desirable to use the example extended block matching algorithm described above for MV estimation. Thus, using pixels across block boundaries to determine the MV error helps to avoid the inclusion of blocking artifacts in the filtered image.

The pixel MV error level indicator, α(x,y,k), is desirably a continuous function of the pixel MV error for the pixel. For example, the pixel MV error, e(x,y,k), of each pixel in the second frame of video data may then be converted to the pixel MV error level indicator using the following:

$$\alpha(x, y, k) = \frac{\min[t_1 - t_1, \max(e(x, y, k) - t_1, 0)]}{t_2 - t_1}, \quad (14)$$

where $t_1$ and $t_2$ are MV parameters calculated based on a noise level of the video data.

Figure 8:
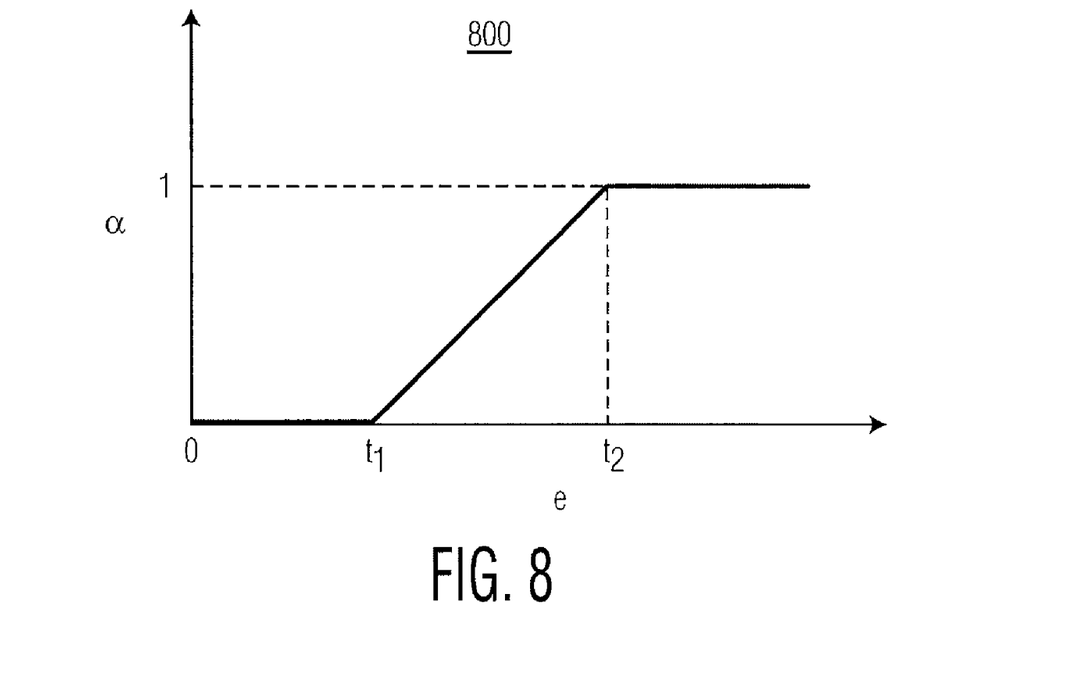
FIG. 8 is a graph illustrating a pixel MV error level indicator that may be used in the methods of FIGS. 3 and 5.

FIG. 8 shows example graph 800 of the pixel MV error level indicator function of Eq. (14).

Returning to FIG. 3, at step 308, the MCTF pixel value of each pixel is calculated using the stored pixel value of the pixel and the stored pixel value of the corresponding pixel in the first frame determined in step 306.

In an example embodiment, the MCTF process is done block by block in the raster scan order. It is desirably applied to the original, non-overlapping blocks, not on the extended, overlapping blocks. Once the MV has been obtained for the current block, the motion compensated temporal filtering may start. This filtering is desirably applied to every pixel inside the block in the raster scan order.

The MCTF pixel value at pixel (x, y) is defined as the weighted average of $f(x,y,k)$ and $\tilde{f}(x+dx,y+dy,k-1)$, i.e., $$f_{mc}(x,y,k) = w \cdot f(x,y,k) + (1-w) \cdot \tilde{f}(x+dx,y+dy,k-1), \quad (15)$$

where the weighting, w, is a predetermined value such as, for example ⅓.

For each pixel in the second frame, a filtered pixel value of the pixel is calculated at step 312 using the MASTF pixel value of the pixel determined at step 302, the MCTF pixel value of the pixel calculated at step 308, and the pixel MV error level indicator of the pixel determined at step 306.

In an example embodiment (shown in FIG. 8), the value of the pixel MV error level indicator, $\alpha(x,y,k)$, ranges from 0 to 1. A small $\alpha(x,y,k)$ value means that the MV at pixel (x,y) is likely to be reliable. Likewise, a large $\alpha(x,y,k)$ value indicates that the MV at pixel (x,y) is likely to be unreliable. It is desirable for the MCTF to be applied to those pixels that have reliable MVs; however, when pixel MV is unreliable, the MCTF is desirably switched off, and the MASTF applied. Desirably, this may be accomplished by a soft switching process using Eq. (1), which includes continuous pixel MV error level indicator function, $\alpha(x,y,k)$, as a weighting factor that ranges from 0 to 1 as the pixel MV error increases.

From Eq. (1) one can see that when the value of $\alpha(x,y,k)$ is close to 0 (i.e. the MV error is low) the MCTF pixel value dominates the example filter, and when the value of $\alpha(x,y,k)$ is close to 1 (i.e. the MV error is high) the MASTF pixel value dominates. This example method desirably avoids undesirable filtering artifacts that may occur when the estimated MVs are unreliable.

The filtered pixel values of the plurality of pixels may desirably be stored as a filtered frame of video data. This filtered frame of video data may replace the previous unfiltered frame in the sequence of frames of video data. Alternatively, the filtered pixel values may be encoded and then stored as indicated at step 314.

As shown in Eq. (1), use of the example pixel MV error level indicator described above is desirable in the example filter of FIG. 3. Unlike a hard switching process between different types of filters, a soft switching mechanism using this example pixel MV error level indicator may avoid layer artifact sin the filtered image that may be caused by hard switching.

One parameter used in the example filter is the noise level $\sigma_n$, which actually determines the filter strength. Depending on different applications, the noise level may be provided either by system or by a noise estimator. When implementing an embodiment of the present invention in a video capture system, $\sigma_n$ may be set to depend on the sensor characteristics, analog gains, and/or expose time.

It is noted that the example filter described above is mainly for the luma (Y) signal; however, similar filtering processes may be applied to one, or both, of the chroma signals (U and V) with some changes in the calculation of the pixel MV error level indicator. Let $\alpha_u(x,y,k)$ and $\alpha_v(x,y,k)$ be the chroma MV error level indicators for U and V, respectively, which are calculated similarly as the luma MV error level indicator $\alpha(x,y,k)$ for Y. Although $\alpha_u(x,y,k)$ and $\alpha_v(x,y,k)$ may be used to determine the weighting of the MASTF and MCTF chroma values in the calculation of the filtered pixel values of the plurality of pixels, it may be desirable to use effective chroma MV error level indicators $\tilde{\alpha}_u(x,y,k)$ and $\tilde{\alpha}_v(x,y,k)$ instead, where $\tilde{\alpha}_u(x,y,k)$ and $\tilde{\alpha}_v(x,y,k)$ are defined as follows:

$$\tilde{\alpha}_u(x,y,k)=(1-\alpha_u(x,y,k))\cdot\alpha(x,y,k)+\alpha_u(x,y,k) \quad (16)$$

$$\tilde{\alpha}_v(x,y,k)=(1-\alpha_v(x,y,k))\cdot\alpha(x,y,k)+\alpha_v(x,y,k) \quad (17)$$

Using the effective chroma MV error level indicators $\tilde{\alpha}_u(x,y,k)$ and $\tilde{\alpha}_v(x,y,k)$ desirably guarantee that when MCTF is switched off for luma (Y), it will also be switched off for chroma (U and V).

It is noted that example embodiments of the method of FIG. 3 may be embodied in special purpose circuitry, ASICs, a general purpose computer programmed to perform the steps of the example methods, or a combination thereof. Instructions to cause a general purpose computer to perform these steps may be stored on computer readable storage medium. Such computer-readable media may include; integrated circuits, magnetic and optical storage media.

Although the invention is illustrated and described herein with reference to specific embodiments, it is not intended to be limited to the details shown. Rather, various modifications may be made in the details within the scope and range of equivalents of the claims and without departing from the invention. Specifically, it is contemplated that features of the several disclosed embodiments may be used in different combinations to form further embodiments.

What is claimed:

1. A method of filtering video data, the video data including a sequence of frames, each frame of the video data including a plurality of pixels, the method comprising the steps of:

storing a first frame of the video data;

storing a second frame of the video data, the second frame following the first in the sequence of frames of the video data;

calculating a motion adapted spatio-temporal filter (MASTF) pixel value of each pixel of the second frame using stored pixel values of pixels of the first frame of video data and stored pixel values of pixels of the second frame of video data;

comparing the second frame of video data to the first frame of video data to estimate a motion vector (MV) of each pixel in the second frame of video data;

determining a pixel MV error level indicator for pixels in the second frame using the stored pixel values of pixels of the first frame of video data, the stored pixel values of pixels of the second frame of video data, and the MVs of pixels in the second frame of video data;

calculating a motion compensated temporal filter (MCTF) pixel values of pixels of the second frame using the stored pixel values of pixels of the first frame of video data, the stored pixel values of pixels of the second frame of video data, and the MVs of pixels in the second frame of video data;

for each pixel in the second frame, calculating a filtered pixel value of the pixel using the MASTF pixel value of the pixel, the MCTF pixel value of the pixel, and the pixel MV error level indicator of the pixel; and storing the filtered pixel values of the plurality of pixels as a filtered frame of video data.

2. A method according to claim 1, wherein the first frame of the video data is a filtered frame of video data.

3. A method according to claim 1, wherein calculating the MASTF pixel values of the pixels of the second frame includes, for each pixel in the second frame, the steps of:

calculating a pixel motion level indicator using the stored pixel values of pixels in a motion level (ML) window centered on the pixel in the second frame and the stored pixel values of collocated pixels in the first frame of video data;

calculating a temporal filter (TF) pixel value of the pixel using the stored pixel value of the pixel and the stored pixel value of the collocated pixel in the first frame;

calculating a spatial filter (SF) pixel value of the pixel using the stored pixel values of pixels in the second frame in an SF window centered on the pixel; and calculating the MASTF pixel value of the pixel using the pixel motion level indicator, the TF pixel value, and the SF pixel value of the pixel.

4. A method according to claim 3, wherein calculating the MCTF pixel values of the pixels of the second frame includes, for each pixel in the second frame, the steps of:
- determining a corresponding pixel in the first frame using the estimated MV of the pixel;
- comparing the stored pixel values of pixels in an MV error window centered on the pixel in the second frame and the stored pixel values of the corresponding pixels in the first frame of video data to determine a pixel MV error level indicator of each pixel; and
- calculating the MCTF pixel value of the pixel using the stored pixel value of the pixel and the stored pixel value of the corresponding pixel in the first frame.

5. A method according to claim 4, wherein:
- the stored pixel value of each pixel in the first frame and the second frame includes a stored luma value and two stored chroma values;
- the TF pixel value of each pixel in the second frame includes a TF luma value and two TF chroma values;
- the SF pixel value of each pixel in the second frame includes an SF luma value and two SF chroma values;
- the MASTF pixel value of each pixel in the second frame includes an MASTF luma value and two MASTF chroma values;
- the MCTF pixel value of each pixel in the second frame includes an MCTF luma value and two MCTF chroma values; and
- the filtered pixel value of each pixel in the second frame includes a filtered luma value and two filtered chroma values.

6. A method according to claim 3, wherein the pixel motion level indicator of each pixel in the second frame of video data is a continuous function of a pixel difference value of the pixel, and
the pixel difference value, d(x,y,k), of each pixel in the second frame of video data is calculated using one of:

$$d(x, y, k) = \left[ \sum_{x',y' \in W_{ML}} \frac{[f(x', y', k) - f(x', y', k-1)]^2}{|W_{ML}|} \right]^{\frac{1}{2}};$$

or $$d(x, y, k) = \sum_{x',y' \in W_{ML}} \frac{|f(x', y', k) - f(x', y', k-1)|}{|W_{ML}|},$$

where x denotes a pixel column of the video data, y denotes a pixel row of the video data, k denotes a frame of the video data, f(x,y,k) is the pixel value of pixel (x,y) in frame k, and $|W_{ML}|$ is a window size of the ML window, $W_{ML}$.

7. A method according to claim 3, wherein the ML window is M rows by N columns, where M and N are positive odd integers.

8. A method according to claim 7, wherein M=N.

9. A method according to claim 3, wherein calculating the TF pixel value of each pixel in the second frame of video data includes calculating a weighted average of the stored pixel value of the pixel and the stored pixel value of the collocated pixel in the first frame.

10. A method according to claim 3, wherein calculating the SF pixel value of each pixel in the second frame of video data includes calculating a weighted average of the stored pixel values of pixels in the SF window centered on the pixel.

11. A method according to claim 1, wherein determining a pixel MV error level indicator for each pixel in the second frame includes the steps of:
- determining a corresponding pixel in the first frame using the estimated MV of the pixel; and
- comparing stored pixel values of pixels in an MV error window centered on the pixel in the second frame and stored pixel values of the corresponding pixels in the first frame of video data to determine the pixel MV error level indicator of the pixel.

12. A method according to claim 11, wherein:
the MV error window is M rows by N columns, where M and N are positive odd integers; and
estimating the MV of each pixel in the second frame of video data includes:
- dividing the second frame of video data into a plurality of non-overlapping blocks;
- extending each non-overlapping block to form a plurality of overlapping blocks by including:
  - (M-1)/2 rows on a top side of the non-overlapping block;
  - (M-1)/2 rows on a bottom side of the non-overlapping block;
  - (N-1)/2 columns on a left side of the non-overlapping block; and
  - (N-1)/2 columns on a right side of the non-overlapping block;
- applying a block matching motion estimation algorithm to each overlapping block of the second frame to match the overlapping block of the second frame with a matching block of the first frame; and
- estimating the MV of each pixel in each overlapping block of the second frame to be an displacement between the overlapping block and the corresponding matching block of the first frame.

13. A method according to claim 11, wherein calculating the MCTF pixel value of each pixel in the second frame of video data includes calculating a weighted average of the stored pixel value of the pixel and the stored pixel value of the corresponding pixel in the first frame.

14. A method according to claim 1, wherein the pixel MV error level indicator, α(x,y,k), of each pixel in the second frame of video data is in a range, 0≦α(x,y,k)≧1, where x denotes a pixel column of the video data, y denotes a pixel row of the video data, and k denotes a frame of the video data.

15. A method according to claim 1, further comprising the step of:
replacing the second frame of the sequence of frames with the filtered frame of video data.

16. A video signal filtering apparatus, comprising:
- a motion vector (MV) estimation processor to compare a first frame of a video signal to a second frame of the video signal and to estimate an MV of each pixel in the second frame;
- a motion compensation (MC) processor coupled to the MV estimation processor to determine a corresponding pixel of first frame of the video signal for each pixel of the second frame of the video signal based on the MV of the pixel estimated by the MV estimation processor;
- a pixel MV error processor coupled to the MC processor to compare the pixels of the second frame to the corresponding pixels of the first frame to determine a pixel MV error for each pixel of the second frame of the video signal;
- an MC temporal filter (MCTF) processor coupled to the MC processor to compute a MCTF pixel value for each pixel of the second frame, the MCTF pixel value of each pixel of the second frame being a weighted average of a pixel value of the pixel and a pixel value of the corresponding pixel in the first frame;

a motion level (ML) processor to compare the first frame of the video signal to the second frame of the video signal and to determine an ML of each pixel in the second frame;

a temporal filter (TF) processor to compute a TF pixel value for each pixel of the second frame, the TF pixel value of each pixel of the second frame being a weighted average of the pixel value of the pixel and the pixel value of collocated pixel in the first frame;

a spatial filter (SF) processor to compute an SF pixel value for each pixel of the second frame, the SF pixel value of each pixel of the second frame being a weighted average of the pixel values of the pixels in a window centered on the pixel;

an motion adaptive spatio-temporal filter (MASTF) control processor coupled to the ML processor, the TF processor, and the SF processor to compute a MASTF pixel value for each pixel of the second frame, the MASTF pixel value of each pixel of the second frame being a weighted average of the TF pixel value and the SF pixel value of the pixel, a weighting of the weighted average based on the ML of the pixel; and a filter control processor coupled to the pixel MV error processor, the MCTF processor, and the MASTF control processor to compute a filtered pixel value for each pixel of the second frame, the filtered pixel value of each pixel of the second frame being a weighted average of the MCTF pixel value and the MASTF pixel value of the pixel, a weighting of the weighted average based on the pixel MV error of the pixel.

17. A video signal filtering apparatus according to claim 16, further comprising:

an input buffer coupled to the MV estimation processor, the pixel MV error processor, the MCTF processor, the ML processor, the TF processor, and the SF processor, the input buffer storing the pixel values of the pixels of the second frame of the video signal and providing the stored pixel values to the MV estimation processor, the pixel MV error processor, the MCTF processor, the ML processor, the TF processor, and the SF processor;

a filtered frame buffer coupled to the MV estimation processor, the MC processor, the ML processor, the TF processor, and the filter control processor, the filtered frame buffer storing the pixel values of the pixels of the first frame of the video signal and providing the stored pixel values to the MV estimation processor, the MC processor, the ML processor, and the TF processor;

wherein, after the filtered pixel values of the pixels of the second frame have been computed:
the filter control processor provides the filtered pixel values of the pixels of the second frame to the filtered frame buffer to replace the first frame of video data; and
a new frame of video data is stored in the input buffer.

18. A filtered video encoding apparatus, comprising:
a video source to provide a video signal;
a motion compensation (MC) processor coupled to the video source to estimate a corresponding pixel from a first frame of the video signal for each pixel of a second frame of the video signal using a motion estimation algorithm;
a pixel MV error processor coupled to the video source and the MC processor to compare the pixels of the second frame to the corresponding pixels to determine a pixel MV error for each pixel of the second frame of the video signal;

an MC temporal filter (MCTF) processor coupled to the video source and the MC processor to compute a MCTF pixel value for each pixel of the second frame, the MCTF pixel value of each pixel of the second frame being a weighted average of a pixel value of the pixel and a pixel value of the corresponding pixel;

an motion adaptive spatio-temporal filter (MASTF) processor coupled to the video source to compute a MASTF pixel value for each pixel of the second frame, the MASTF pixel value of each pixel of the second frame being a weighted average of a temporal filter (TF) pixel value and a spatial filter (SF) pixel value of the pixel a weighting of the weighted average based on a motion level of the pixel, the TF pixel value of each pixel of the second frame based on the pixel value of the pixel and the pixel value of a collocated pixel in the first frame, and the SF pixel value of each pixel of the second frame based on the pixel values of the pixels in a window centered on the pixel;

a filter control processor coupled to the pixel MV error processor, the MCTF processor, and the MASTF processor to compute a filtered frame of video data, a filtered pixel value of each pixel of the filtered frame being a weighted average of the MCTF pixel value and the MASTF pixel value of the pixel, a weighting of the weighted average based on the pixel MV error of the pixel; and a video encoder coupled to the filter control processor to encode the filtered frame of video data.

19. A video signal filtering apparatus according to claim 18, wherein the video source includes at least one of:
a video camera;
a video storage medium with the video signal stored thereon and a video storage medium reader; or
a computer readable storage medium with the video signal stored thereon and a general purpose computer.

20. A video signal filtering apparatus according to claim 18, wherein the MC processor includes:
an MV processor to calculate the MV of each pixel of the second frame of the video signal using the pixels of the first frame and the second frame of the video signal;
a corresponding pixel processor to estimate the corresponding pixel for each pixel of a second frame of the video signal.

21. A video signal filtering apparatus according to claim 20, wherein:
the MV calculated by the MV processor is quantized in units of 1/m row pixels by 1/n column pixels, m and n are positive integers;
the corresponding pixel for each pixel of the second frame of the video signal is estimated by the corresponding pixel processor by interpolating pixels of the first frame of the video signal that are within about one pixel of an displacement from the pixel of the second frame defined by the MV.

22. A video signal filtering apparatus according to claim 18, wherein the video encoder encodes encode the filtered frame of video data using an H.264 protocol.

23. A video signal filtering apparatus according to claim 18, further comprising a video storage medium coupled to the video encoder to store the encoded filtered frame of video data.

24. A computer readable medium adapted to instruct a general purpose computer to filter a sequence of frames of video data, each frame of the video data including a plurality of pixels, the method comprising the steps of:
- storing a first frame and a second frame of the video data in memory of the general purpose computer;
- for each pixel in the second frame, using a motion adapted spatio-temporal filter (MASTF) algorithm to determine an MASTF pixel value of the pixel using stored pixel values of pixels in the second frame in a spatial filter window centered on the pixel and stored pixel value of a collocated pixel in the first frame;
- comparing the second frame of video data to the first frame of video data to estimate a motion vector (MV) of each pixel in the second frame of video data;
- for each pixel in the second frame,
  - determining a corresponding pixel in the first frame using the estimated MV of the pixel;
  - comparing stored pixel values of pixels in an MV error window centered on the pixel in the second frame and stored pixel values of the corresponding pixels in the first frame of video data to determine a pixel MV error level indicator of each pixel; and
  - calculating a motion compensated temporal filter (MCTF) pixel value of the pixel using the stored pixel value of the pixel and the stored pixel value of the corresponding pixel in the first frame;
- for each pixel in the second frame, calculating a filtered pixel value of the pixel using the MASTF pixel value of the pixel, the MCTF pixel value of the pixel, and the pixel MV error level indicator of the pixel; and
- storing the filtered pixel values of the plurality of pixels in memory of the general purpose computer as a filtered frame of video data.

25. A computer readable medium adapted to instruct a general purpose computer to encode a sequence of frames of video data, each frame of the video data including a plurality of pixels, the method comprising the steps of:
- storing a first frame and a second frame of the video data in memory of the general purpose computer;
- for each pixel in the second frame, using a motion adapted spatio-temporal filter (MASTF) algorithm to determine an MASTF pixel value of the pixel using stored pixel values of pixels in the second frame in a spatial filter window centered on the pixel and stored pixel value of a collocated pixel in the first frame;
- using a motion vector (MV) estimation algorithm to determine:
  - a corresponding pixel in the first frame for each pixel in the second frame; and
  - a pixel MV error level indicator of each pixel in the second frame;
- for each pixel in the second frame, calculating a motion compensated temporal filter (MCTF) pixel value of the pixel using the stored pixel value of the pixel and the stored pixel value of the corresponding pixel in the first frame;
- for each pixel in the second frame, calculating a filtered pixel value of the pixel using the MASTF pixel value of the pixel, the MCTF pixel value of the pixel, and the pixel MV error level indicator of the pixel;
- encoding the filtered pixel values of the plurality of pixels; and
- storing the encoded video data in memory of the general purpose computer.

* * * * *